United States Patent
Weaver

[11] Patent Number: 5,900,816
[45] Date of Patent: May 4, 1999

[54] ANTI-SHOPLIFTING SECURITY SYSTEM UTILIZING A MODULATED TRANSMITTER SIGNAL

[76] Inventor: Jon Neal Weaver, 1511 NW. 35$^{th}$ Ter., Gainesville, Fla. 32605

[21] Appl. No.: 08/878,239

[22] Filed: Jun. 18, 1997

[51] Int. Cl.$^6$ .................................................... G08B 13/14
[52] U.S. Cl. ........................................ 340/572.2; 340/551
[58] Field of Search ............................... 340/572.2, 551, 340/572.1, 572.4

[56] References Cited

U.S. PATENT DOCUMENTS

| | | | |
|---|---|---|---|
| 3,686,564 | 8/1972 | Mallick, Jr. et al. | 324/232 |
| 3,990,065 | 11/1976 | Purinton et al. | 340/572 |
| 4,302,846 | 11/1981 | Stephen et al. | 340/572 |
| 4,710,752 | 12/1987 | Cordery | 340/572 X |
| 4,779,076 | 10/1988 | Weaver | 340/572 X |
| 4,791,412 | 12/1988 | Brooks | 340/572 |
| 5,005,001 | 4/1991 | Cordery | 340/572 X |

FOREIGN PATENT DOCUMENTS

0611164  8/1994  European Pat. Off. .

*Primary Examiner*—Jeffery A. Hofsass
*Assistant Examiner*—Sihong Huang
*Attorney, Agent, or Firm*—Saliwanchik, Lloyd & Saliwanchik

[57] ABSTRACT

The present invention relates to a method and apparatus for detecting the presence of a soft magnetic marker in an interrogation zone. This invention utilizes a modulated transmitter carrier signal generated in an interrogation zone. Modulated harmonics of the transmitter carrier signal are detected when a marker is present in the interrogation zone. The modulation detected can be at the same frequency as the modulation of the transmitter signal or a harmonic of the modulation of the transmitter signal. Detection of the modulation allows higher signal to noise ratios and therefore reduces false detections.

11 Claims, 6 Drawing Sheets

ANTI-SHOPLIFTING SECURITY SYSTEM UTILIZING A MODULATED TRANSMITTER SIGNAL

CROSS-REFERENCE TO A RELATED APPLICATION

This application claims the benefit of the filing date of U.S. Application Ser. No. 08/699,880 filed on Aug. 16, 1996, which application in its entirety is hereby incorporated herein by reference.

BACKGROUND OF THE INVENTION

This invention relates to electronic article surveillance (EAS) systems. These systems are often used to detect shoplifters or otherwise monitor the movements of tagged articles. The EAS systems of the type to which the subject invention is directed, are generally employed to detect the presence of a magnetic marker in a magnetic field. Such systems thus include a device, for example a generating coil, for generating the magnetic field, and another device, for example a receiving coil, for detecting signals generated when a marker is passed through the field.

Important considerations in the design of EAS systems include, for example, power consummation of the system, cost of the system, signal-to-noise ratio of the received signal, and sensitivity to a marker in the detection field. Factors which may influence the signal-to-noise ratio and sensitivity to a marker in the field may include coupling of the generated magnetic field and/or marker generated fields in the receiver, metallic objects in the vicinity of the EAS system, spurious emissions, and electromagnetic interference. Improving the signal-to-noise ratio and sensitivity to a marker in the field generally involves increased power consumption of the EAS system transmitter and/or receiver circuitry.

Prior disclosed EAS systems have utilized pulsed transmitter signals and corresponding detection of the signal generated by a marker located in the magnetic field produced by the transmitter. For example, both electromagnetic (EM) and radio frequency (RF) EAS systems have been disclosed which utilized a pulsed transmitter signal. These systems have received, during the "off" cycle of the transmitter signal, the signal generated by a marker due to the marker's response to the transmitter signal generated during the "on" cycle of the transmitter. In these systems, the pulsing of the transmitter resulted in somewhat better signal to noise ratios. However, no attempt was made to detect modulation as an indication of the presence of a marker.

In addition, prior EAS systems, for example, in U.S. Pat. Nos. 4,710,752 and 5,005,001, have also been disclosed which create modulation via generation of two overlapping magnetic fields having different frequencies. In these systems, the amplitudes of sidebands of the harmonics, generated by a marker, were compared as an indication of marker presence. However, these systems did not attempt to detect modulation as an indication of the presence of a marker.

BRIEF SUMMARY OF THE INVENTION

The subject invention pertains to a novel Electronic Article Surveillance (EAS) system and a method of electronic article surveillance which is able to detect tagged articles with, for example, reduced incidence of false alarms in the presence of noise, lower power consumption, and lower costs than current systems. Advantageously, the subject invention allows significant improvement in noise reduction and greatly increased sensitivity to a marker in the detection field. In a specific embodiment, the EAS system of the subject invention utilizes an amplitude modulated transmitter carrier signal created by an electromagnetic generator and single coil. When a soft magnetic marker is brought into the transmitter field, the marker generates a signal. This signal generated by the marker contains harmonics of the transmitter carrier signal which are amplitude modulated at the same frequency as the transmitter modulation signal. In addition, the marker signal contains harmonics of the transmitter carrier signal which are modulated at frequencies which are harmonics of the transmitter modulation signal. Accordingly, the receiver coil and receiver signal processor of the subject EAS system can receive the signal generated by the marker. In a preferred embodiment, the receiver demodulates the received harmonics of the transmitter carrier signal and detects the modulation having the same frequency as the amplitude modulation signal as an indication that a marker is present. In a more preferred embodiment, the receiver demodulates the received harmonics of the transmitter carrier signal and detects the modulation having frequencies which are harmonics of the amplitude modulation signal as an indication that a marker is present.

Advantageously, the subject EAS system can have a higher signal-to-noise ratio than other systems utilizing amplitude modulated transmitted signals. The subject EAS system detects the modulated harmonics and/or the harmonics of modulation generated by the marker, where modulated harmonics and/or harmonics of modulation are only present when a marker, or similar object, is present in the detection field.

DETAILED DISCLOSURE OF THE INVENTION

The subject invention pertains to a novel Electronic Article Surveillance (EAS) system and a method of electronic article surveillance which is able to detect tagged articles with reduced incidence of false alarms in the presence of noise, lower power consumption, and lower costs than current systems. Advantageously, the subject invention allows significant improvement in noise reduction and greatly increased sensitivity to a marker in the detection field. In a specific embodiment, the EAS system of the subject invention utilizes an amplitude modulated transmitter signal created by, for example, an electromagnetic generator and coil. When a soft magnetic marker is brought into the transmitter field, the marker generates a signal. This signal generated by the marker contains harmonics of the transmitter carrier signal which are amplitude modulated at the same frequency as the transmitter modulation signal. In addition, the marker signal contains harmonics of the transmitter carrier signal which are modulated at frequencies which are harmonics of the transmitter modulation signal. Accordingly, the receiver coil and receiver signal processor of the subject EAS system can receive the signal generated by the marker. In a preferred embodiment, the receiver demodulates the received harmonics of the transmitter carrier signal and detects the modulation having the same frequency as the amplitude modulation signal as an indication that a marker is present. In a more preferred embodiment, the receiver demodulates the received harmonics of the transmitter carrier signal and detects the modulation having frequencies which are harmonics of the amplitude modulation signal as an indication that a marker is present.

Advantageously, the subject EAS system can have a higher signal-to-noise ratio than other systems utilizing amplitude modulated transmitter signals. For example, prior radio frequency EAS systems utilizing amplitude modulated transmitters attempt to detect the modulated field produced by the marker, in the presence of coupling of the modulated field produced by the transmitter in the receiver. Specifically, the modulation is present whether or not a marker is present in the detection field, due to coupling in the receiver. Accordingly, these other amplitude modulated systems must then differentiate the signal due to the presence of a marker and the signal due to coupling of the transmitter generated field in the receiver. With respect to the subject invention, the modulation itself is not a problem. This is because modulated harmonics and/or harmonics of the modulation generated by a marker are detected, which are present only when a marker is present.

The subject invention improves on previous designs by maximizing a modulated signal from the marker while the transmitter is generating its highest (peak) output signal and, simultaneously, reducing the power consumption of the system when the transmitter is generating its lowest output signal. In addition, modulating the transmitter output signal can further enhance detection by reducing the shielding of the marker by the transmitter. This shielding effect occurs when the transmitter output signal is at a maximum and can be reduced or eliminated when the transmitter output signal is reduced. In a preferred embodiment, the minimum transmitter output signal magnitude is between about 30 percent and about 50 percent of the maximum transmitter output signal magnitude. When a marker is near the transmitter coil during the maximum transmitter signal the marker can, in effect, be shielded by the transmitter and, therefore, not be detected. However, when the transmitter signal drops to about 30 to about 50 percent of the maximum, the marker is no longer shielded and can be detected, thus enhancing detection. This effect can also be observed when the transmitter is pulsed on and off if the rising and/or falling edge(s) of the pulse train reside at a value of 30–50 percent of the maximum value for a sufficient duration, thus allowing detection of a marker near the transmitter coil.

Additionally, modulating the transmitter output signal, the subject invention allows the use of smaller markers, fewer loops on the transmitter antenna coil, and/or more peak power with the same components as previous EAS systems. The use of smaller markers can reduce the expense of marking items, as well as allowing more effective marking. For example, the smaller markers can be more discretely appended to merchandise. Transmitter coils having fewer loops are less expensive to build, lighter, and more compact. It is a matter of design choice as to which of these advantages to exploit. In addition, by detecting modulation of harmonics of the transmitter carrier signal, the effects of coupling of unwanted signals from the transmitter in the receiver are minimized, creating a very high signal to noise ratio.

In a specific embodiment, for example when extremely high noise environments are encountered, the subject EAS system can alternate the modulation frequency from a first frequency to a second frequency in order to produce a dual (two tone) modulation which is extremely difficult to duplicate in ordinary circumstances and environments. This reduces the probability of false detections. In a specific embodiment, referring to FIG. 3, different modulation frequencies are accomplished with the transmitter modulation frequency locked to the receiver modulation filter. This circuitry can act independently from the general EAS system frequency or circuitry.

EXAMPLE 1

Figure 1:
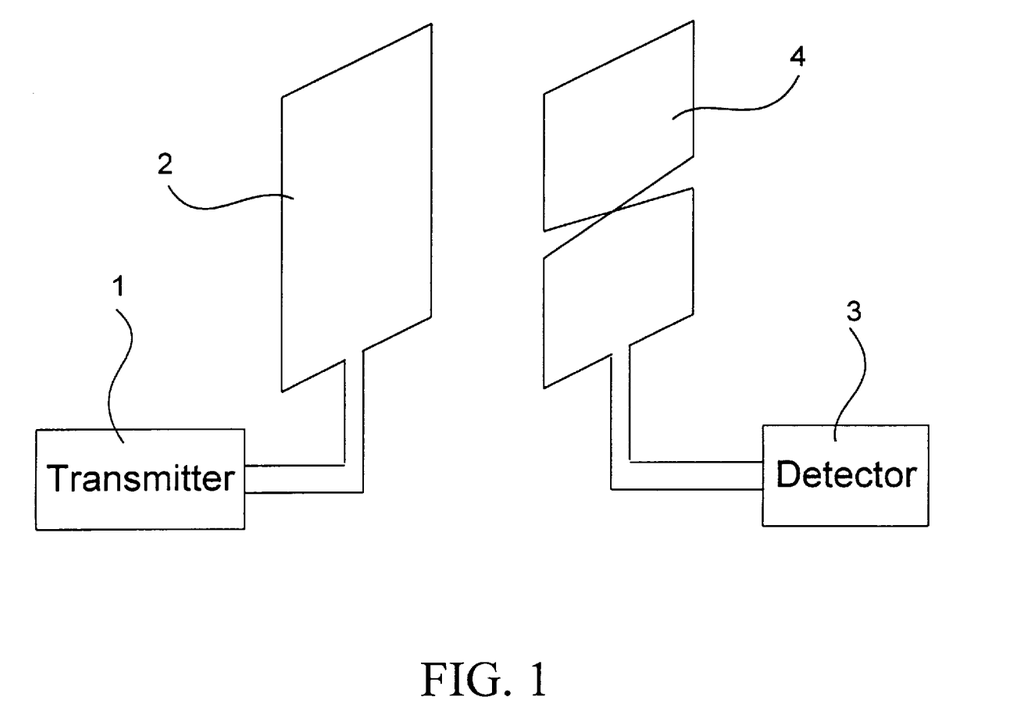
FIG. 1 shows a schematic representation of an embodiment of an EAS system transmitter and receiver in accordance with the subject invention.
Figure 2A:
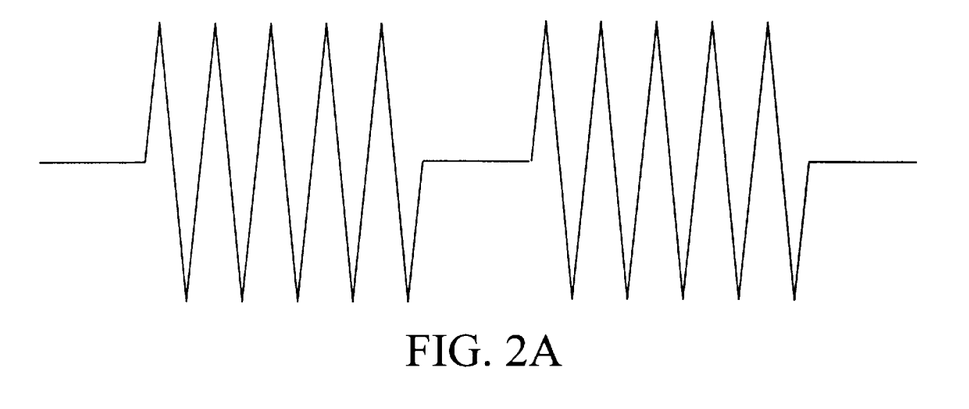
FIG. 2A shows one representation of an amplitude modulated transmitter signal in accordance with the subject invention.
Figure 2B:
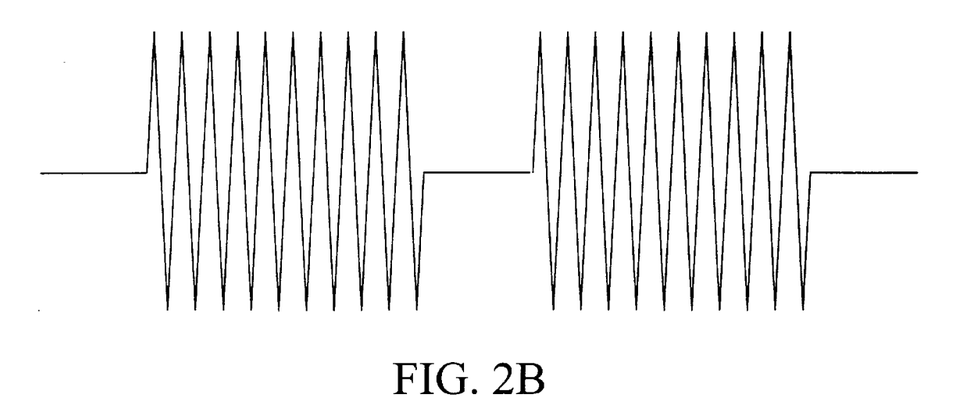
FIG. 2B shows a representation of an amplitude modulated harmonic produced by a marker located in the field produced by the amplitude modulated transmitter signal of FIG. 2A, in accordance with the subject invention.
Figure 2C:
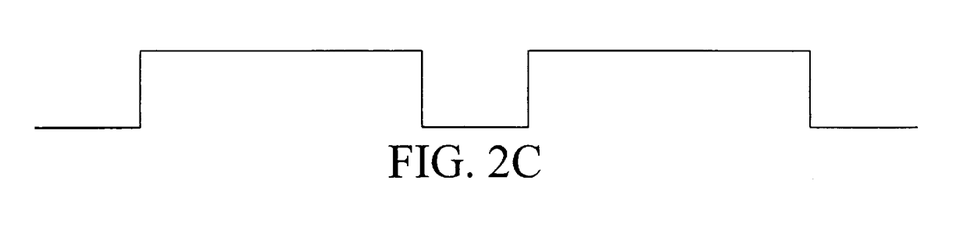
FIG. 2C shows a representation of a modulation waveform which can be used in accordance with the subject invention.

Referring to FIG. 1, a specific embodiment of the subject invention can comprise transmitting generator 1 and transmitting coil 2 for generating a magnetic field in the interrogation zone, and detector 3 and receiving coil 4 for receiving and detecting magnetic fields generated by a marker located in the interrogation zone. FIG. 2A shows one representation of an amplitude modulated transmitter signal in accordance with the subject invention. This transmitter carrier signal can have many different waveform shapes, for example sinusoidal. Referring to FIG. 2C, the modulating signal can also have many different waveform shapes and/or parameters. For example, the amplitude modulating signal can have equal duration on and off cycles, or an on cycle to off cycle ratio which differs from one. The off cycle can be set to turn the transmitter signal completely off or set to lower the magnitude of the transmitter signal. For example, the amplitude modulating signal can vary between a peak value and some fraction, for example 50 percent, of peak value. FIG. 2B shows a representation of a signal generated by a marker present in the interrogation zone, which is a harmonic of the transmitter carrier signal modulated by the modulating signal of FIG. 2C. Detector 3 can receive and demodulate the modulated harmonic generated by a marker and utilize the modulation as an indication of the presence of a marker.

EXAMPLE 2

Figure 3:
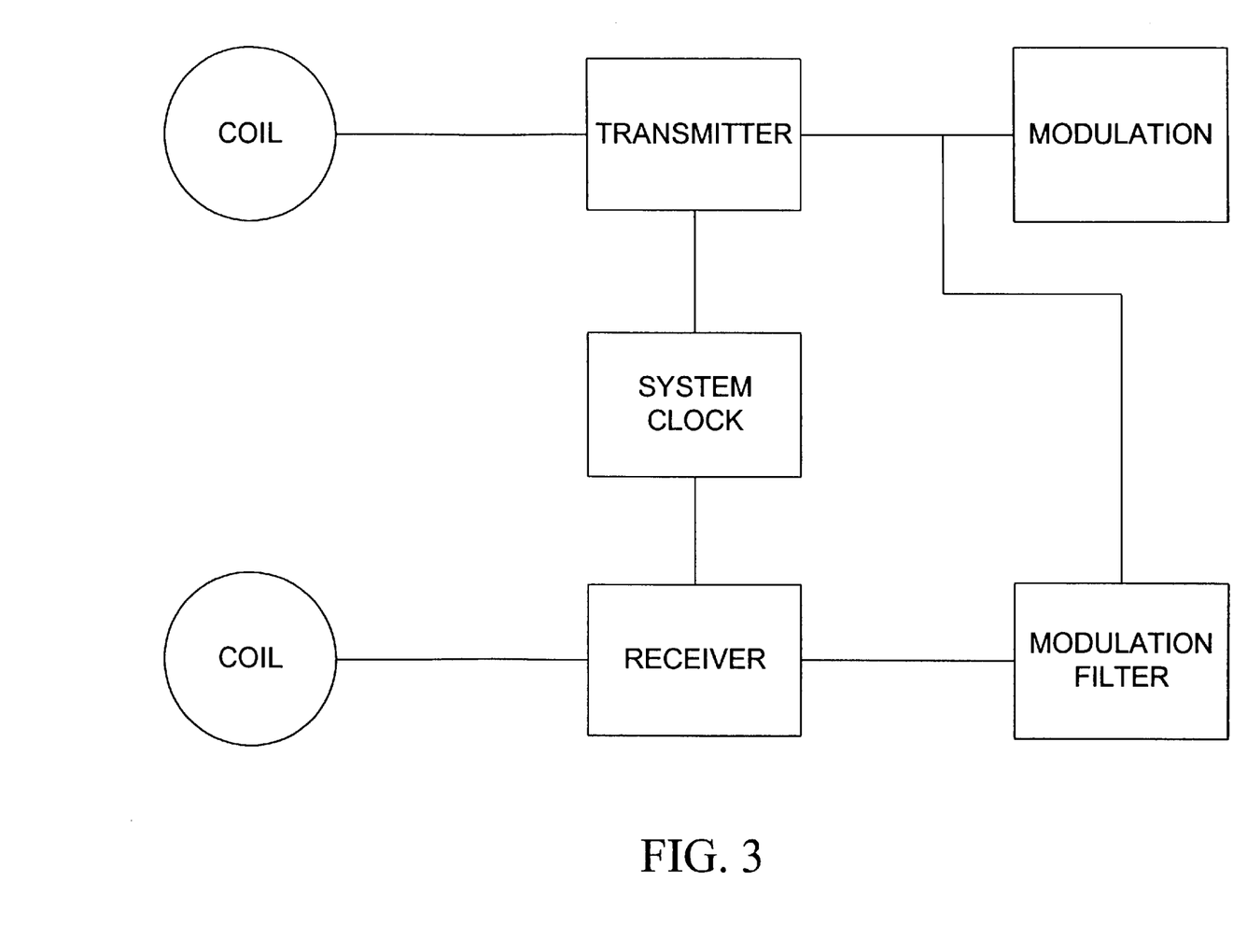
FIG. 3 shows a schematic of an embodiment of an EAS system with the transmitter modulation frequency locked to the receiver modulation filter in accordance with the subject invention.

A further embodiment of the subject invention is particularly advantageous when extremely high noise environments are encountered. The embodiment described in Example 1 can be utilized with additional circuitry added to allow the modulation frequency to alternate among at least two frequencies. For example, the frequency of the modulating signal can alternate between a first frequency and a second frequency in order to produce a dual (two tone) modulation. This two tone modulation is unlikely to be duplicated by noise, thus lower the probability of false detections. Referring to FIG. 3, different modulation frequencies can be accomplished by, for example, locking the transmitter modulation frequency to the receiver modulation filter. Preferably, this circuitry can act independently from the general EAS system circuitry.

EXAMPLE 3

Figure 4:
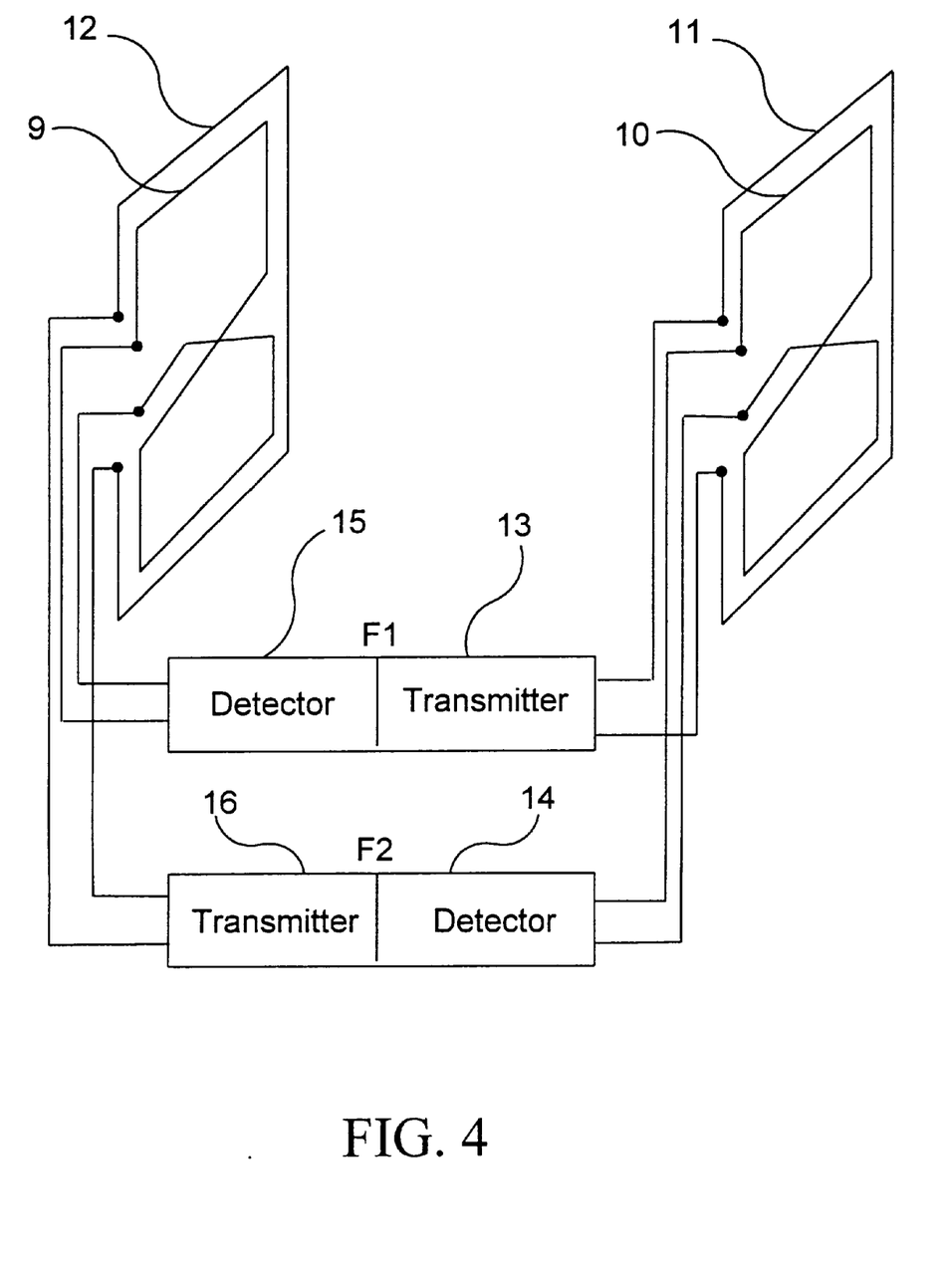
FIG. 4 shows a schematic representation of an embodiment of an EAS system having two transmitter-receiver pairs, in accordance with the subject invention.

In an additional embodiment of the subject invention, two transmitter-receiver pairs can be utilized to, for example, increase the width of the interrogation zone which can be monitored. Referring to FIG. 4, each pair can comprise a transmitting coil 11, 12 and a receiving coil 9, 10. In a specific embodiment, transmitting coil 11, preferably of a single coil design, is connected to a first field generator (transmitter) 13, and transmitting coil 12 is connected to a second field generator (transmitter) 16. Associated with transmitter coil 11 is receiver coil 9, which can be parallel to transmitter coil 11 and separated from transmitter coil 11 by the interrogation zone. Associated with transmitter coil 12 is receiver coil 10, which can be parallel to transmitter coil 10 and separated from transmitter coil 12 by the interrogation zone. Receiver coil 9 is connected to detector 15, which employs circuitry to detect a marker, and receiver coil 10 is connected to detector 14 which employs circuitry to detect a marker.

Figure 5A:
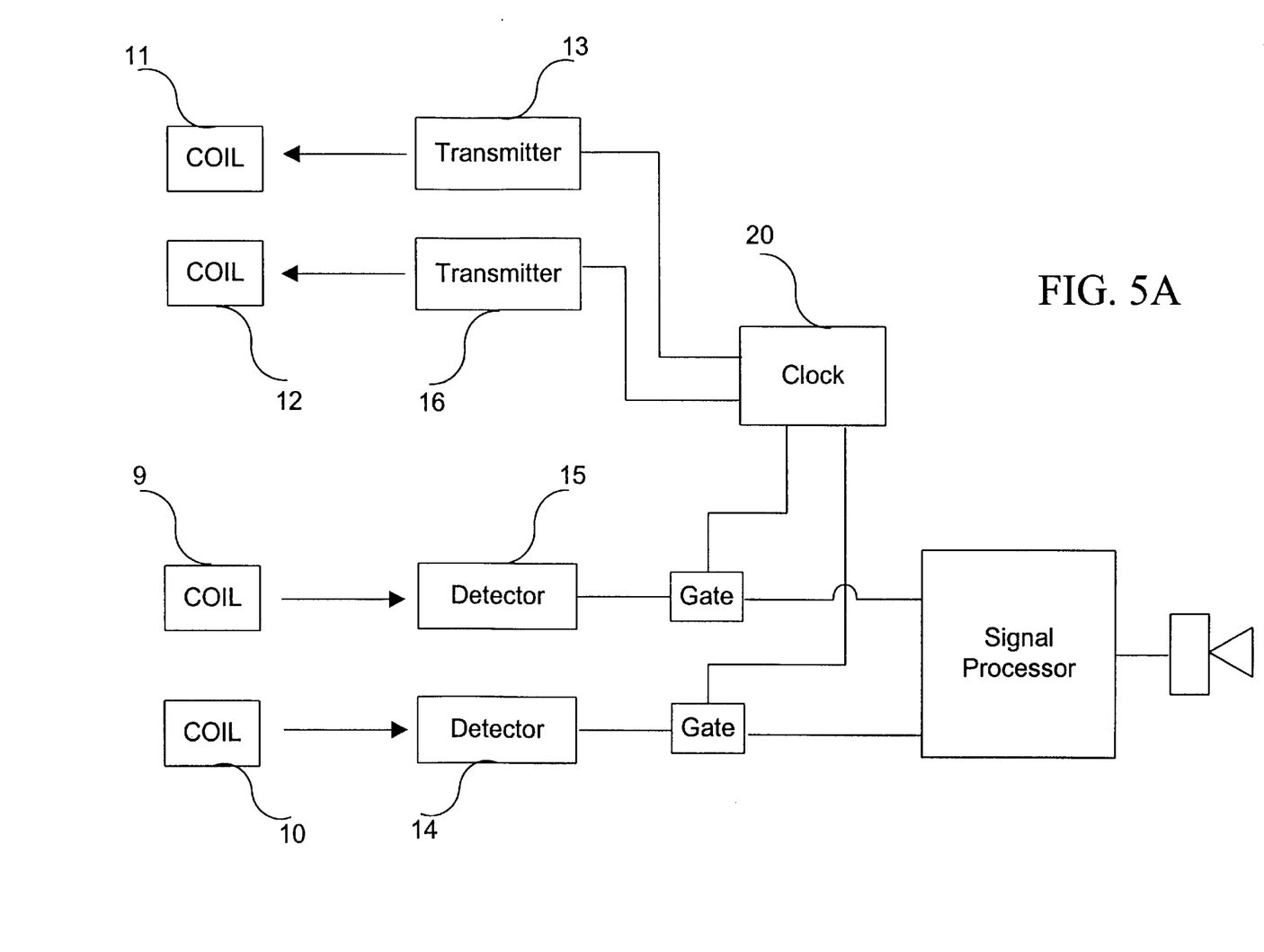
FIG. 5A shows a schematic of an EAS system having two transmitter-receiver pairs wherein the transmitters are turned on and off, out of phase, by a clock.
Figure 5B:
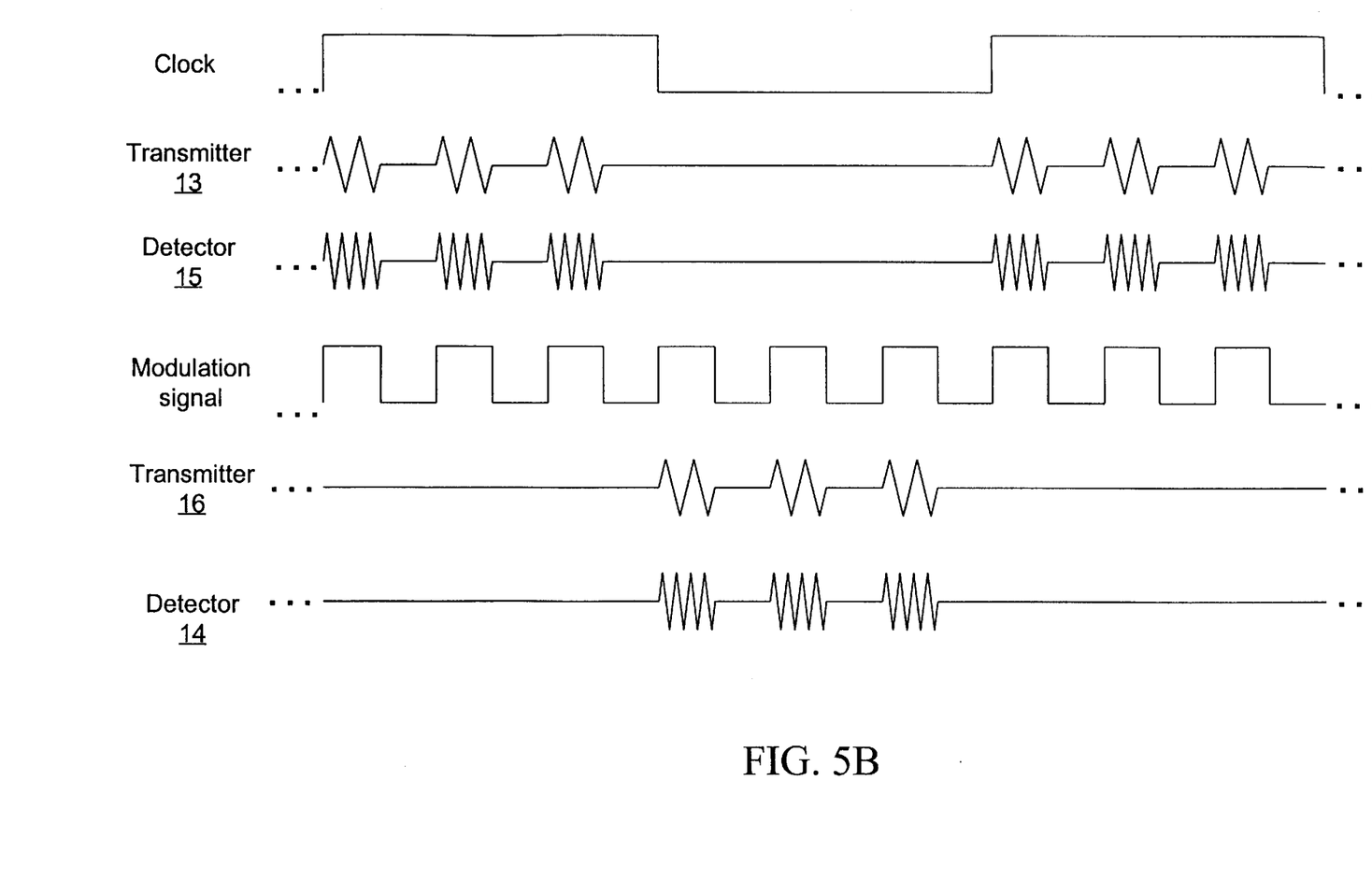
FIG. 5B shows an example of clock, transmitter, receiver, and modulation signals in accordance with the EAS system shown in FIG. 5A.

In a specific embodiment, referring to FIG. 5A, transmitters 13 and 16 may be switched on and off out of phase with each other, for example, by clock 20. Accordingly, when transmitter 13 is on, transmitter 16 is off and vice versa. Referring to FIG. 5B, when transmitter 16 is on, coil 12 generates an appropriate time-varying magnetic field in the interrogation zone, and when transmitter 13 is on, coil 11 generates an appropriate time-varying magnetic field in the interrogation zone. Advantageously, the coil pairs can be separated further, for the same power output, such that each pair only covers one half of the interrogation zone. For example, when a marker is located in the half of the interrogation zone closest to coil 12, the marker will produce an amplitude modulated signal which can be detected and demodulated by detector 14. Likewise, when a marker is located in the half of the interrogation zone closest to coil 11, the marker will produce an amplitude modulated signal which can be detected and demodulated by detector 15. It can be observed, that this embodiment allows various advantages, for example, lower power consumption, smaller transmitter coils, and/or a wider interrogation zone.

EXAMPLE 4

Referring to FIG. 4, various alternative switching schemes for coils 11 and 12 can be realized according to the subject invention. For example, in a specific embodiment, coil 11 and coil 12 can be modulated at different frequencies. The signal from the marker can be detected and demodulated, with the amplitude modulation indicating the presence of a marker. Alternatively, coil 11 and coil 12 can be modulated at different frequencies and the signal from a marker can be detected and demodulated, with the phase modulation used as an indication of the presence of a marker.

In an additional embodiment coil 11 and coil 12 can be connected to transmitter 13 and 16, respectively, wherein the transmitters 13 and 16 operate at different frequencies. For example, as set forth in U.S. application Ser. No. 08/699,880 filed on Aug. 16, 1996 which has been incorporated herein by reference, operating transmitters 13 and 16 at different frequencies can create an amplitude and phase modulated harmonic signal produced by a marker. Furthermore, transmitters 13 and 16 can be switched on and off, or pulsed, simultaneously in order to create an additional amplitude modulation within the harmonic generation of the marker. The result of amplitude modulation, or switching on and off, of the two carriers and the phase modulation created by two different transmitter frequencies creates a marker harmonic signal having amplitude modulation at a specific frequency and a phase modulation at another unique frequency. The combination of the amplitude modulation at a specific frequency and the phase modulation at another unique frequency are not easily realized by random noise sources.

In a specific embodiment, coil 11 can be driven at 1000 Hz and coil 12 can be driven at 1020 Hz, creating a marker signal with a phase modulation of 20 Hz or a multiple of 20 Hz. In addition, if both transmitters are simultaneously switched on and off, or pulsed, at 6 Hz, a marker signal can contain a 6 Hz amplitude modulation of the marker generated harmonics of the transmitter signals. Accordingly, phase detection and narrow band filtering of the 20 Hz, or multiple of 20 Hz, signal produce a 20 Hz phase modulation signal which can indicate the presence of a marker in the interrogation zone. In addition, amplitude detection and narrow band filtering of the 6 Hz amplitude modulation results in a 6 Hz amplitude modulation signal which can also indicate the presence of a marker in the interrogation zone In a preferred embodiment, both the 20 Hz phase modulation signal and the 6 Hz amplitude modulation signal can be detected and used as an indication of the presence of a marker wherein combination of both modulation signals is extremely difficult to replicate in any noise environment and therefore can reduce false alarms. Advantageously, the switching of transmitters on and off allows the use of smaller transmitter coils without reducing peak transmit field intensities.

I claim:

1. A system for detecting the presence of a ferromagnetic marker in an interrogation zone, comprising:

a generating means for generating an amplitude modulated magnetic field in the interrogation zone; and a detecting means for detecting a modulated harmonic signal produced by a ferromagnetic marker present within the interrogation zone, wherein said detecting means demodulates said modulated harmonic signal and utilizes a resulting modulation signal as an indication of the presence of said marker in the interrogation zone, wherein said amplitude modulated magnetic field is produced by a transmitter coil driven at a carrier frequency and modulated by an amplitude modulation signal, wherein said modulated harmonic signal is a harmonic of said carrier frequency modulated at the frequency of the amplitude modulation signal or a harmonic of the frequency of the amplitude modulation signal, and wherein the frequency of said amplitude modulation signal is less than about 50 hertz.

2. A system for detecting the presence of a ferromagnetic marker in an interrogation zone, comprising:

a generating means for generating an amplitude modulated magnetic field in the interrogation zone; and a detecting means for detecting a modulated harmonic signal produced by a ferromagnetic marker present within the interrogation zone, wherein said detecting means demodulates said modulated harmonic signal and utilizes a resulting modulation signal as an indication of the presence of said marker in the interrogation zone, wherein said amplitude modulated magnetic field is produced by a transmitter coil driven at a carrier frequency and modulated by an amplitude modulation signal, wherein said modulated harmonic signal is a harmonic of said carrier frequency modulated at the frequency of the amplitude modulation signal or a harmonic of the frequency of the amplitude modulation signal, wherein said amplitude modulation signal is a pulse train which alternates in magnitude between a maximum value and a minimum value, and wherein said minimum value is between about 30 percent and about 50 percent of the maximum value.

3. The system according to claim 2, wherein said pulse train alternates in magnitude between a maximum value and approximately a zero value.

4. A system for detecting the presence of a ferromagnetic marker in an interrogation zone, comprising
a first generating means for generating a first magnetic field in the interrogation zone at a first frequency;
a second generating means for generating a second magnetic field in the interrogation zone at a second frequency; and
a detecting means for receiving and demodulating a signal generated by a marker present in the interrogation zone, wherein a resulting modulation signal is used as an indication of the presence of said marker in the interrogation zone, wherein said second frequency is about 3 to about 50 hertz lower or higher than said first frequency, and wherein phase modulation of said marker generated signal is detected.

5. The system according to claim 4, wherein said first generating means and said second generating means are pulsed out of phase with each other, wherein said first generating means and said second generating means are each pulsed between a maximum value and a minimum value between about 30 percent and about 50 percent of the maximum value.

6. A method for detecting the presence of a ferromagnetic marker in an interrogation zone, comprising the following steps:
generating an amplitude modulated magnetic field in the interrogation zone; and
detecting a modulated harmonic signal produced by a ferromagnetic marker present within the interrogation zone, wherein said modulated harmonic signal is demodulated and a resulting modulation signal is used as an indication of the presence of said marker in the interrogation zone, wherein said amplitude modulated magnetic field is produced by a transmitter coil driven at a carrier frequency and modulated by an amplitude modulation signal, wherein said modulated harmonic signal is a harmonic of said carrier frequency modulated at the frequency of the amplitude modulation signal or a harmonic of the frequency of the amplitude modulation signal, and wherein the frequency of said amplitude modulation signal is less than about 50 hertz.

7. A method for detecting the presence of a ferromagnetic marker in an interrogation zone, comprising the following steps:
generating an amplitude modulated magnetic field in the interrogation zone; and
detecting a modulated harmonic signal produced by a ferromagnetic marker present within the interrogation zone, wherein said modulated harmonic signal is demodulated and a resulting modulation signal is used as an indication of the presence of said marker in the interrogation zone, wherein said amplitude modulated magnetic field is produced by a transmitter coil driven at a carrier frequency and modulated by an amplitude modulation signal, wherein said modulated harmonic signal is a harmonic of said carrier frequency modulated at the frequency of the amplitude modulation signal or a harmonic of the frequency of the amplitude modulation signal, wherein said amplitude modulation signal is a pulse train which alternates in magnitude between a maximum value and a minimum value, and wherein said minimum value is between about 30 percent and about 50 percent of the maximum value.

8. The method according to claim 7, wherein said pulse train alternates between a maximum value and approximately a zero value.

9. A method for detecting the presence of a ferromagnetic marker in an interrogation zone, comprising the following steps:
generating a first magnetic field in the interrogation zone at a first frequency;
generating a second magnetic field in the interrogation zone at a second frequency; and
receiving and demodulating a signal generated by a marker present in the interrogation zone, wherein a resulting modulation signal is used as an indication of the presence of said marker in the interrogation zone, wherein said second frequency is about 3 to about 50 hertz lower or higher than said first frequency, and wherein phase modulation of said marker generated signal is detected.

10. The method according to claim 9, further comprising the step of pulsing said first and second magnetic fields out of phase with each other, wherein said first and second magnetic fields are each pulsed between a maximum value and a minimum value between about 30 percent and about 50 percent of the maximum value.

11. The method according to claim 10, wherein phase modulation of said marker generated signal is detected.

* * * * *